United States Patent
Qiu et al.

(10) Patent No.: US 10,362,226 B2
(45) Date of Patent: Jul. 23, 2019

(54) METHOD TO CONTROL LENS OF A CAMERA MODULE, A LENS CONTROL TERMINAL AND A STORAGE MEDIA

(71) Applicant: HISENSE MOBILE COMMUNICATIONS TECHNOLOGY CO., LTD., Qingdao (CN)

(72) Inventors: Xudong Qiu, Qingdao (CN); Hongcheng Wang, Qingdao (CN)

(73) Assignees: Hisense Mobile Communications Technology Co., Ltd., Qingdao (CN); Hisense USA Corporation, Suwanee, GA (US); Hisense International Co., Ltd., Qingdao (CN)

(*) Notice: Subject to any disclaimer, the term of this patent is extended or adjusted under 35 U.S.C. 154(b) by 394 days.

(21) Appl. No.: 15/416,809

(22) Filed: Jan. 26, 2017

(65) Prior Publication Data

US 2017/0155838 A1 Jun. 1, 2017

Related U.S. Application Data

(63) Continuation of application No. 14/707,365, filed on May 8, 2015, now Pat. No. 9,591,214.

(30) Foreign Application Priority Data

Sep. 28, 2014 (CN) .......................... 2014 1 0506967

(51) Int. Cl.
*H04N 5/232* (2006.01)
*G02B 7/10* (2006.01)
*G02B 7/02* (2006.01)

(52) U.S. Cl.
CPC ......... *H04N 5/23241* (2013.01); *G02B 7/023* (2013.01); *G02B 7/102* (2013.01)

(58) Field of Classification Search
CPC .......... G02B 7/102; G02B 7/023; G03B 3/02; G03B 17/04; G03B 13/02; G03B 3/10; H04N 5/2254; H04N 5/23296; H04N 5/23241; H04N 5/23245
See application file for complete search history.

(56) References Cited

U.S. PATENT DOCUMENTS

| 5,572,270 | A |  | 11/1996 | Yamamoto et al. |
| 5,892,998 | A | * | 4/1999 | Kodaira .................. G03B 9/26 396/134 |
| 6,643,458 | B2 |  | 11/2003 | Sakamoto |

(Continued)

FOREIGN PATENT DOCUMENTS

| CN | 1447183 A | 10/2003 |
| CN | 1598682 A | 3/2005 |

(Continued)

*Primary Examiner* — Roberto Velez
*Assistant Examiner* — Tuan H Le
(74) *Attorney, Agent, or Firm* — Harness, Dickey & Pierce, P.L.C.

(57) ABSTRACT

Some embodiments in this disclosure provide a method to control lens of a camera module, a lens control terminal and a storage media, wherein the method to control lens of a camera module includes receiving power-off signal of the camera module; controlling the lens moving towards a zero position gradually, till the lens moves back to the zero position; powering off the camera module.

16 Claims, 3 Drawing Sheets

(56) References Cited

U.S. PATENT DOCUMENTS

| | | | |
|---|---|---|---|
| 2003/0174229 A1* | 9/2003 | Kubota | H04N 5/232 348/335 |
| 2009/0190242 A1* | 7/2009 | Shi | G02B 7/023 359/823 |
| 2009/0278976 A1 | 11/2009 | Shibata | |
| 2011/0115968 A1 | 5/2011 | Yamanaka | |
| 2012/0050897 A1* | 3/2012 | Akada | H02P 6/16 359/824 |
| 2012/0076481 A1* | 3/2012 | Heo | G03B 3/10 396/90 |
| 2012/0257099 A1* | 10/2012 | Tsai | G02B 7/08 348/349 |
| 2013/0113985 A1 | 5/2013 | Ikeda et al. | |
| 2013/0241318 A1* | 9/2013 | Ke | H02K 41/0356 310/12.16 |
| 2014/0066122 A1* | 3/2014 | Shukla | H02K 41/0356 455/556.1 |
| 2015/0085148 A1* | 3/2015 | Park | H02K 41/0354 348/208.1 |

FOREIGN PATENT DOCUMENTS

| | | |
|---|---|---|
| CN | 101174014 A | 5/2008 |
| CN | 102841487 A | 12/2012 |

* cited by examiner

METHOD TO CONTROL LENS OF A CAMERA MODULE, A LENS CONTROL TERMINAL AND A STORAGE MEDIA

CROSS-REFERENCE TO RELATED APPLICATIONS

This application is a continuation of U.S. patent application Ser. No. 14/707,365 filed May 8, 2015, which claims the benefit and priority of Chinese Patent Application No. 201410506967.7 filed Sep. 28, 2014. The entire disclosures of each of the above applications are incorporated herein by reference.

FIELD

The present disclosure relates to the camera technology field, especially to a method to control a lens of a camera module, a lens control terminal and a storage media.

BACKGROUND

This section provides background information related to the present disclosure which is not necessarily prior art.

Currently camera devices on terminals ordinarily have automatic focusing function, and focusing is the key operation to ensure forming clear images. For example voice coil motors are widely used in cell phones, which include a coiled floating device, a magnet, a lens inside the floating device, and a spring piece used to keep the floating device in a floating state. When switched on, the magnet outside the coil interacts with electric current, making the floating device moving against elastic force of the spring piece, so that the camera device could focus automatically.

In practice, after using the camera function in a cell phone or a pad, when user finishes taking pictures, the camera module moves back to a zero position.

SUMMARY

This section provides a general summary of the disclosure, and is not a comprehensive disclosure of its full scope or all of its features.

Some embodiments in this disclosure provide a method to control a lens of a camera module, the method to control the lens of the camera module includes receiving a power-off signal of the camera module; controlling the lens moving towards a zero position gradually, till the lens moves back to the zero position; powering off the camera module.

Other embodiments in this disclosure provide a lens control terminal of a camera module, wherein, including: a memory and one or more processors, wherein the memory stores one or more computer readable program codes, and the one or more processors are configured to perform the one or more computer readable program codes to implement: receiving a power-off signal of the camera module; controlling a lens of the camera module moving towards a zero position gradually, till the lens moves back to the zero position; powering off the camera module.

Some embodiments in this disclosure provide a computer readable storage media, wherein the storage media stores indication codes, the indication codes are configured to be performed to enable the user equipment to perform the following operations: receiving a power-off signal of a camera module; controlling a lens of the camera module moving towards a zero position gradually, till the lens moves back to the zero position; powering off the camera module.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
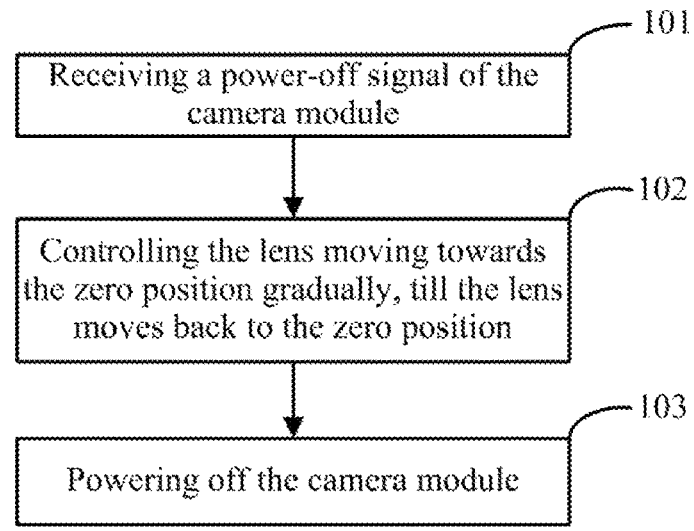
FIG. 1 is a flowchart of a method to control lens of a camera module in some embodiments provided in this disclosure.

As shown in FIG. 1, some embodiments in this disclosure disclose a method to control a lens of a camera module, including the following operations:

Operation 101. Receiving a power-off signal of the camera module.

The terminals referred in this disclosure include but not limit to a camera and an electronic equipment which has a camera, the electronic equipment could be a cell phone, a pad, and a laptop. The camera includes a camera module. When camera applications are performed, the power supply powers up the camera module, providing driving electric current for the motor. When the user enters into other applications or when there is an incoming call or when the terminal automatically powers off, the terminal needs to quit the camera application, and a power-off signal is created. Currently, when receiving the power-off signal of the camera module, the camera module will be powered off immediately, thus the driving electric current for the motor will be cut off, which causing the camera to move back because of lack of motor drive. In the embodiments of this disclosure, when receiving the power-off signal of the camera module, the camera module will not be powered off immediately. Instead, the Operation 102 will be performed.

Operation 102. controlling the lens moving towards the zero position gradually, till the lens moves back to the zero position.

In some embodiments, when the driving electric current for the motor is zero, the lens moves by the elastic force of the spring piece, till the lens reaches the position in which the lens touches other parts on the bottom of the camera module. Such position may be the zero position of the lens.

When the lens is not at the zero position, the lens will be controlled moving towards the zero position in several times. The lens moves a certain distance each time, doesn't move to the zero position in one time. Thus an abnormal sound and structure damages caused by lens suddenly moving back to zero position in one time may be avoided.

Operation 103. Powering off the camera module.

After finishing above Operations 101-102, the lens is at the zero position, then it powers off the camera module.

Some embodiments of this disclosure ensure that before powering off the camera module, confirming the lens is not at the zero position, and forcing the lens to move back to the zero position. Such move is gradual. Therefore, it avoids abnormal sound and structure damages caused by lens suddenly moving back to the zero position in one time when losing drive force from the motor.

Figure 2:
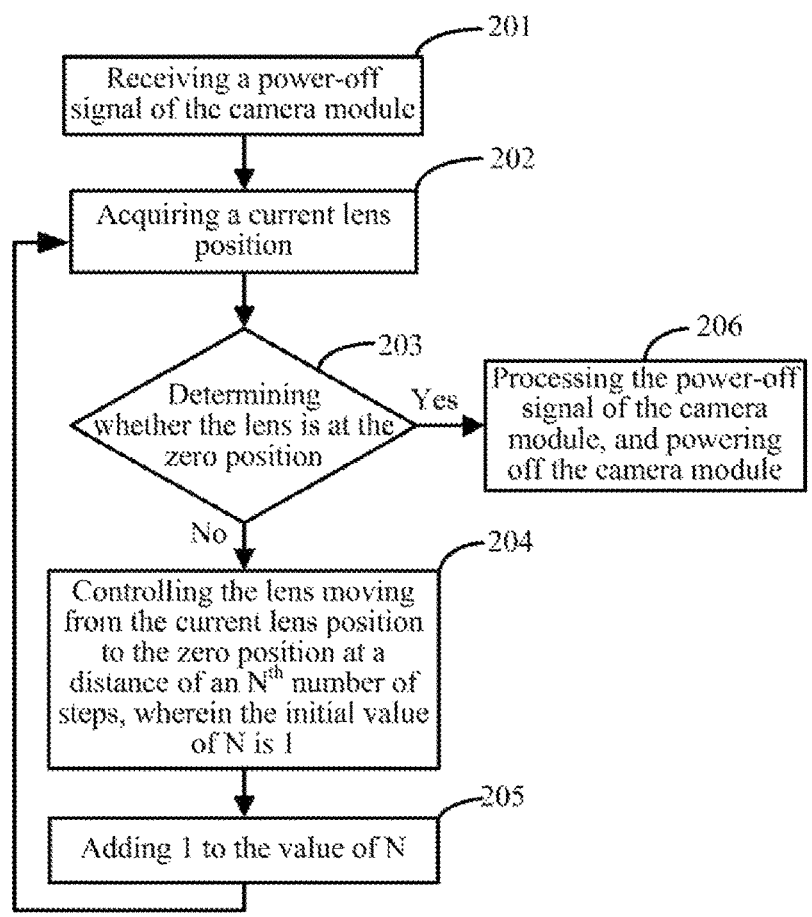
FIG. 2 is a flowchart of a method to control lens of a camera module in some embodiments provided in this disclosure.

As shown in FIG. 2, some embodiments in this disclosure disclose a method to control a lens of a camera module, including the following operations:

Operation 201. Receiving a power-off signal of the camera module.

Operation 202. Acquiring a current lens position.

In some embodiments, the distance between the zero position to the position where the lens is farthest from the CCD image sensor is divided, and the distance may be divided evenly into several even length distance. One such even length may be a distance unit, and each distance unit may be one step. For example, the number of steps between the lens and the zero position (for example, when the lens is 10 steps from the zero position, the number of steps between the lens and the zero position is 10, herein the number of steps intends to express there are how many steps) can be used to determine the current position of the lens. Since when focusing the lens, the lens' movement is implemented by controlling the magnitude of the electric current of the driving motor, thus the number of the steps between the lens and the zero position could be determined by reading the electric current value.

Operation 203. Determining whether the lens is at the zero position, and if the lens is at the zero position, perform Operation 206. Otherwise, perform Operation 204.

Determining whether the lens is at the zero position can be performed by determining whether the electric current value of the driving motor is zero. If the electric current value is zero, it may mean the lens is at the zero position.

Operation 204. When the lens is not at the zero position, controlling the lens moving from the current lens position to the zero position at a distance of an $N^{th}$ number of steps, wherein the initial value of N is 1.

When the electric current value of the driving motor is not zero, the lens is not at the zero position, moving the lens to the zero position at a distance of an $N^{th}$ number of steps. If the value of the $N^{th}$ number of steps is 3, the distance of the $N^{th}$ number of steps is a distance of three steps, then the lens moves to the zero position by the distance of three steps. It is to be understood that the value of the $N^{th}$ number of steps may be changed according to the circumstances.

Operation 205. Adding 1 to the value of N, and repeating Operations 202-204, till the lens is back at the zero position.

This operation can be implemented by determining if the lens is back at zero position. If the lens is at the zero position, it means the lens is back at the zero position after the last move, and Operation 206 may be performed. Otherwise, controlling the lens to move towards the zero position by a distance of the second number of steps (taking the number of steps in the last move is the first number of steps as an example). The above operations may be repeated till the lens is back at the zero position.

Operation 206. Processing the power-off signal of the camera module, and powering off the camera module.

In some embodiments, moving the lens to the zero position gradually is realized by repeating the determination of whether the lens is at the zero position and not moving a certain distance.

Figure 3:
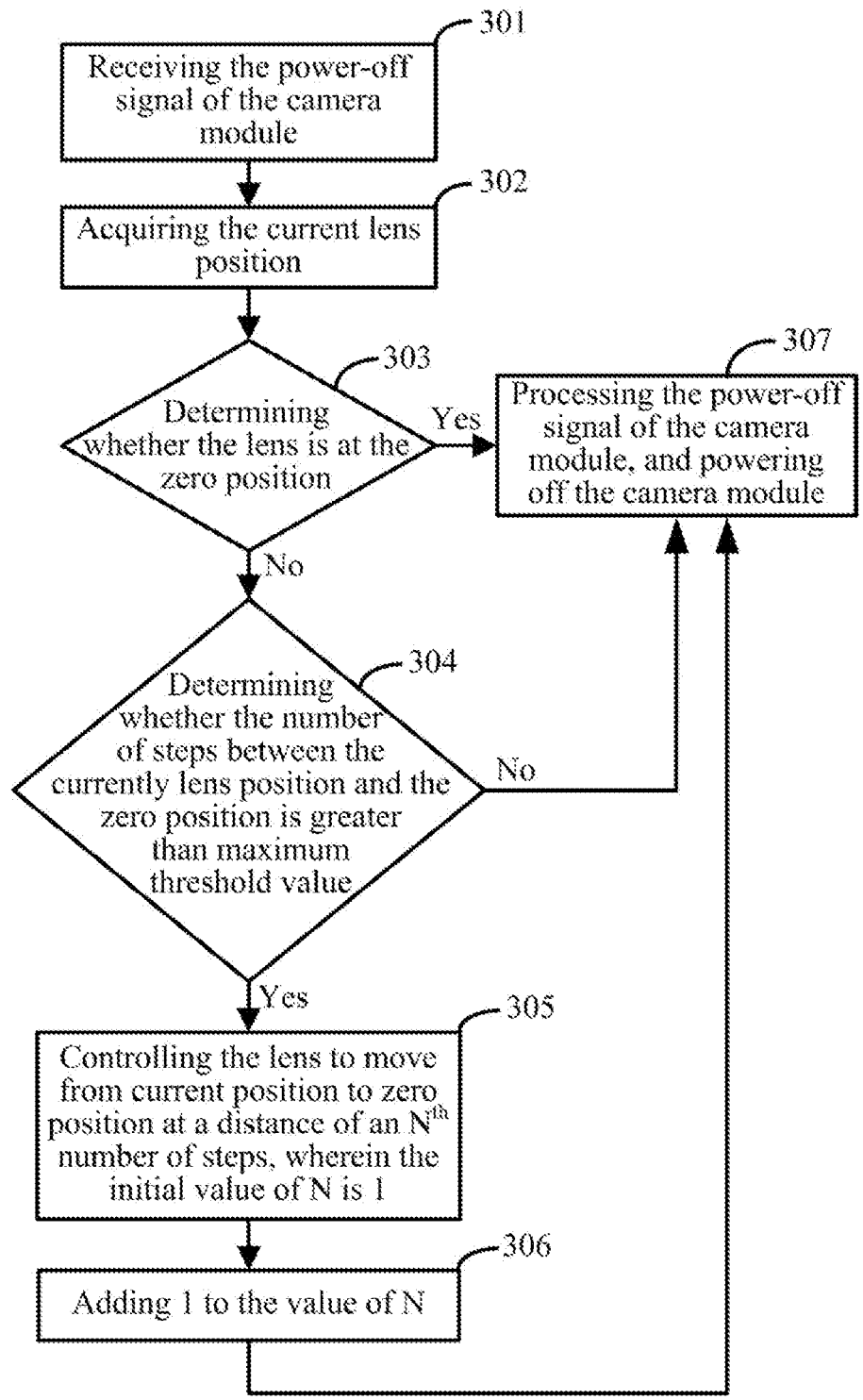
FIG. 3 is a flowchart of a method to control lens of a camera module in some embodiments provided in this disclosure.

As shown in FIG. 3, some embodiments in this disclosure disclose a method to control a lens of a camera module, including the following operations:

Operation 301. Receiving the power-off signal of the camera module.

Operation 302. Acquiring the current lens position.

Operation 303. Determining whether the lens is at the zero position. If the lens is at the zero position, perform Operation 307. Otherwise, perform Operation 304.

Operation 304. If the lens is not at the zero position, determining whether the number of steps between the current lens position and the zero position is greater than maximum threshold value. If it is greater than the maximum threshold value, perform Operation 305; otherwise, perform Operation 307.

In some embodiments, the maximum threshold value may be preset, which is the corresponding number of steps of the distance which the lens moves back to the zero position in one time without causing an abnormal sound or structure damages. For example, when the maximum threshold value is 32, in practice, when the lens moves back to the zero position in one time of the distance of 32 steps from the zero position, the movement almost causes no abnormal sound or structure damages. When the lens moves back to the zero position in one time of the distance of 33 steps from the zero position, the movement causes abnormal sound or structure damages. Therefore, the maximum threshold value is reasonably set. Herein, in practice, the maximum threshold value can be adjusted to enable the lens to move a relatively long distance without causing abnormal sound or structure damages.

When the number of the steps between the current lens position to the zero position is no more than the maximum threshold value, it means the lens may move back to the zero position from the current lens position in one time, without causing abnormal sound or structure damages.

Operation 305. Controlling the lens moving from the current lens position to the zero position at a distance of the $N^{th}$ number of steps, wherein the initial value of N is 1.

Operation 306. Adding 1 to the value of N, and repeating Operations 302-305, till the lens is back at the zero position.

The initial value of N is 1, and the number of steps of the first lens move is the first number of steps, and the number of steps of the second lens move is the second number of steps, so on so forth. Making the number of steps of the last lens move as the $m^{th}$ number of steps.

In some embodiments, each of the numbers of steps from the first number of steps to the $m^{th}$ number of steps may be identical, which means the lens moves an even distance each time. Thus controlling the lens moving towards the zero position gradually till the lens moves back to the zero position in Operation 102 includes: controlling the lens moving towards the zero position periodically till the lens moves back to the zero position.

In some embodiments, each of numbers of steps from the first number of steps to the $m^{th}$ number of steps may be greater than the next one. For example, when the lens is at a position 300 steps from the zero position. In the first move the lens may move a distance of 100 steps, and in the second move the lens may move a distance of 100 steps, and in the third move the lens may move a distance of 70 steps. At this time the lens is 30 steps away from the zero position, which is less than the maximum threshold value 32, which concludes the process. Therefore, the lens may move a longer distance in the first couple of moves, and the distance reduces accordingly, allowing the lens to get back to the zero position as soon as possible without causing abnormal sound or structure damages.

In some embodiments, such number of steps from first to $m^{th}$ can be chosen from a preset table.

For illustration, as shown in Table 1.

TABLE 1

| | number of steps range | | | |
|---|---|---|---|---|
| number of steps of current lens position | 0-100 | 101-200 | 201-300 | ... |
| First number of steps | 32 | 60 | 100 | ... |
| Second number of steps | 32 | 32 | 60 | ... |
| ... | ... | ... | ... | ... |
| $m^{th}$ number of steps | 32 | 32 | 32 | ... |

When the number of steps of the current lens position is within 0-100, the first number of steps may be set at 32. When the number of steps of the current lens position is within 101-200, each one of the first number of steps may be set at 60 and the second number of steps to the $m^{th}$ number of steps may be set at 32. When the number of steps of current lens position is within 201-300, the first number of steps may be set at 100, and the second number of steps may be set at 60 and each one of the third number of steps to the $m^{th}$ number of steps may be set at 32. From above table, setting the first couple of moves at greater number of steps can enable the lens to get back to the zero position as soon as possible. Setting the last couple of moves at a lesser number of steps and setting each at the maximum threshold value 32 can stop the lens from moving too far when back to the zero position and avoid collision.

Operation 307. Processing the power-off signal of the camera module, and powering off the camera module.

Above embodiments are described as combinations of actions for convenience. However it is to be understood by person skilled in this art that this disclosure is not limited by the sequences of the actions, because according to this disclosure, some operations may be performed in other sequences or simultaneously. Further, it is to be understood by person skilled in this art, that embodiments in this disclosure are preferred embodiments, wherein the related actions and modules may not be necessary for this disclosure.

Figure 4:
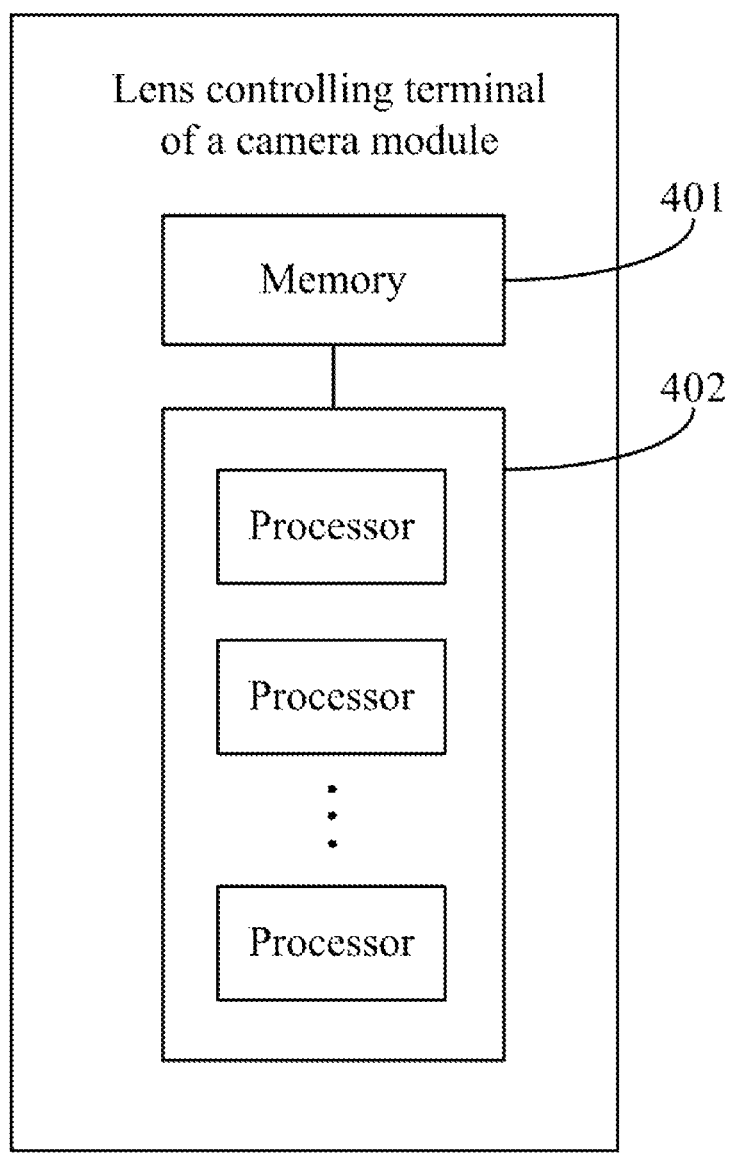
FIG. 4 is a structural illustration of a lens control terminal of a camera module in some embodiments provided in this disclosure.

As shown in FIG. 4, some embodiments in this disclosure provide a lens controlling terminal of a camera module, which includes a memory 401 and one or more processors 402, wherein the memory 401 stores one or more computer readable program codes, and the one or more processors are used to perform the one or more computer readable program codes to implement:

Receiving a power-off signal of the camera module.

Controlling the lens moving towards the zero position gradually, till the lens moves back to the zero position.

Powering off the camera module.

Herein controlling the lens moving towards the zero position gradually, till the lens moves back to the zero position, including a process, the process includes:

S1: acquiring the current lens position;

S2: determining whether the lens is at the zero position;

S3: if the lens is not at the zero position, controlling the lens moving from the current lens position to the zero position at a distance of a $N^{th}$ number of steps;

S4: adding the value of N by 1, and repeating S1-S3, till the lens is back at the zero position; wherein the initial value of N is 1.

In some embodiments, after determining whether the lens is at the zero position, the one or more processors 402 may be further used to perform such one or more computer readable codes to implement:

If the lens is not at the zero position, determining whether the number of steps between the current lens position and the zero position is greater than the maximum threshold value; if greater than the maximum threshold value, performing S3; if not, end the process. Furthermore, setting the last move to distance of a number of steps of $m^{th}$ number of steps, wherein each of numbers of steps from the first number of steps to the $m^{th}$ number of steps is greater than the next one. The each of the numbers of steps from the first number of steps to the $m^{th}$ number of steps may be chosen from a preset list.

In some embodiments, each of the numbers of steps from the first number of steps to the $m^{th}$ number of steps is the same.

For device embodiments, because they are substantially the same as the method embodiments, the description is relatively simple. Relevant parts could be referred to description of the method embodiments.

Every embodiment in this disclosure is described evolutionary, every embodiment focuses on the features different from the other embodiments, and the same parts of every embodiment are cross-reference.

Besides, some embodiments in this disclosure provide a computer readable storage media which stores indication codes. The indication codes are configured to be performed to enable the user equipment to perform the following operations: receiving power-off signal of the camera module; controlling the lens moving towards the zero position gradually, till the lens moves back to the zero position; powering off the camera module.

In some embodiments, when the lens is confirmed not at the zero position, controlling the lens moving towards the zero position gradually, till the lens moves back to the zero position, including a process, the process includes:

S1: acquiring the current lens position;

S2: determining whether the lens is at the zero position;

S3: if the lens is not at the zero position, controlling the lens moving from the current lens position to the zero position at a distance of a $N^{th}$ number of steps;

S4: adding the value of N by 1, and repeating S1-S3, till the lens is back at the zero position; wherein the initial value of N is 1.

In some other embodiments, determining whether the lens is at the zero position further includes: if the lens is not at the zero position, determining whether the operation value between the current lens position and the zero position is greater than the maximum threshold value; if greater than the maximum threshold value, performing S3; if not, ending the process.

In some embodiments, when repeating S1-S3, it sets the last move to a distance of a $m^{th}$ number of steps, wherein each of the numbers of steps from the first number of steps to the $m^{th}$ number of steps is greater than the next one.

In some embodiments, the value of each of the numbers of steps from the first number of steps to the $m^{th}$ number of steps may be chosen from a preset list.

In some embodiments, each of the numbers of steps from the first number of steps to the $m^{th}$ number of steps may be identical.

Although some embodiments of this disclosure have been disclosed, persons skilled in this art may also make additional modifications or alternations once they know the basic inventive concepts. Therefore, what is claimed here shall be construed to include preferred embodiments as well as any and all modifications and alternations that fall into the scope of this disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method to control a lens of a camera module, wherein comprising:
   receiving a power-off signal of the camera module, wherein the camera module is a camera comprising a voice coil motor, the camera module comprises a coiled floating device, a magnet, a lens inside the floating device, and a spring piece used to keep the floating device in a floating state;
   keeping the voice coil motor power on, and moving the lens towards a zero position by controlling a drive current of a coil of the floating device, till the lens moves back to the zero position, when the lens is not at the zero position;
   powering off the camera module.

2. The method of claim 1, wherein moving the lens towards a zero position by controlling a drive current of a coil of the floating device comprises:
   moving the lens towards the zero position in multiple steps by controlling the drive current of the coil of the floating device, wherein each of numbers of steps of moves is greater than or equal to a next one, or numbers of steps for a first couple of moves is greater than numbers of steps for a last couple of moves.

3. The method of claim 1, wherein moving the lens towards the zero position in multiple steps by controlling the drive current of the coil of the floating device, each of numbers of steps from is greater than or equal to a next one, or number of steps for first couple of moves is greater than number of steps for last couple of moves, till the lens moves back to the zero position, when the lens is not at the zero position, comprises:
   S1: acquiring a current lens position;
   S2: determining whether the lens is at the zero position;
   S3: when the lens is not at the zero position, moving the lens by controlling the drive current of the coil from the current lens position to the zero position at a distance corresponding to a $N^{th}$ number of steps;
   S4: adding a value of N by 1, and repeating S1-S3, till the lens is back at the zero position;
   wherein an initial value of N is 1.

4. The method of claim 2, wherein moving the lens towards the zero position in multiple steps by controlling the drive current of the coil, when the lens is not at the zero position, comprises:
   when the lens is not at the zero position, determining whether a number of steps between the current lens position and the zero position is greater than a maximum threshold value, wherein the maximum threshold value is a number of steps corresponding to a maximum distance which enables the lens to move the zero position without causing abnormal sound or structure damages;
   when the number of steps between the current lens position and the zero position is greater than the maximum threshold value, moving the lens towards the zero position in multiple steps by controlling the drive current of the coil.

5. The method of claim 2, wherein the numbers of steps for the first couple of moves are identical, or reduced gradually.

6. The method of claim 2, wherein the numbers of steps for the last couple of moves are identical, or reduced gradually.

7. A method to control a lens of a camera module, wherein, comprising:
   receiving a power-off signal of the camera module, wherein the camera module is a camera comprising a voice coil motor, the camera module comprises a coiled floating device, a magnet, a lens inside the floating device, and a spring piece used to keep the floating device in a floating state;
   keeping the voice coil motor power on, and controlling a drive current of a coil of the floating device to be reduced, till the lens moves back to the zero position, when the lens is not at the zero position;
   powering off the camera module.

8. The method of claim 7, wherein controlling a drive current of a coil of the floating device to be reduced comprises:
   controlling the drive current of the coil to be reduced in multiple times, wherein each of reducing ranges for the drive current is greater than or equal to a next one, or a first couple of reducing ranges for the drive current is greater than a last couple of reducing ranges for the drive current.

9. A lens control terminal of a camera module, wherein the camera module is a camera comprising a voice coil motor, the camera module comprises a coiled floating device, a magnet, a lens inside the floating device, and a spring piece used to keep the floating device in a floating state, the terminal comprises a memory and one or more processors, wherein the memory stores one or more computer readable program codes, and the one or more processors are configured to perform the one or more computer readable program codes to:
   receive a power-off signal of the camera module;
   keep the voice coil motor power on, and move the lens towards a zero position by controlling a drive current of a coil of the floating device, till the lens moves back to the zero position, when the lens is not at the zero position;
   power off the camera module.

10. The terminal of claim 9, wherein the one or more processors are configured to perform the one or more computer readable program codes to move the lens towards a zero position by controlling a drive current of a coil of the floating device through:
    moving the lens towards the zero position in multiple steps by controlling the drive current of the coil of the floating device, wherein each of numbers of steps of moves is greater than or equal to a next one, or numbers of steps for a first couple of moves is greater than numbers of steps for a last couple of moves.

11. The terminal of claim 10, wherein the one or more processors are configured to perform the one or more computer readable program codes to move the lens towards the zero position in multiple steps by controlling the drive current of the coil of the floating device through:

S1: acquiring a current lens position;
S2: determining whether the lens is at the zero position;
S3: when the lens is not at the zero position, moving the lens by controlling the drive current of the coil from the current lens position to the zero position at a distance corresponding to a $N^{th}$ number of steps;
S4: adding a value of N by 1, and repeating S1-S3, till the lens is back at the zero position;
wherein an initial value of N is 1.

12. The terminal of claim 10, wherein the one or more processors are configured to perform the one or more computer readable program codes to move the lens towards the zero position in multiple steps by controlling the drive current of the coil, when the lens is not at the zero position, through:

when the lens is not at the zero position, determining whether a number of steps between the current lens position and the zero position is greater than a maximum threshold value, wherein the maximum threshold value is a number of steps corresponding to a maximum distance which enables the lens to move the zero position without causing abnormal sound or structure damages;
when the number of steps between the current lens position and the zero position is greater than the maximum threshold value, moving the lens towards the zero position in multiple steps by controlling the drive current of the coil.

13. The terminal of claim 10, wherein the one or more processors are configured to perform the one or more computer readable program codes to achieve that the numbers of steps for the first couple of moves are identical, or reduced gradually.

14. The terminal of claim 10, wherein the one or more processors are configured to perform the one or more computer readable program codes to achieve that the numbers of steps for the last couple of moves are identical, or reduced gradually.

15. A lens control terminal of a camera module, wherein the camera module is a camera comprising a voice coil motor, the camera module comprises a coiled floating device, a magnet, a lens inside the floating device, and a spring piece used to keep the floating device in a floating state, the terminal comprises a memory and one or more processors, wherein the memory stores one or more computer readable program codes, and the one or more processors are configured to perform the one or more computer readable program codes to:

receive a power-off signal of the camera module;
keep the voice coil motor power on, and control a drive current of a coil of the floating device to be reduced, till the lens moves back to the zero position, when the lens is not at the zero position;
power off the camera module.

16. The terminal of claim 15, wherein the one or more processors are configured to perform the one or more computer readable program codes to control a drive current of a coil of the floating device to be reduced through:

controlling the drive current of the coil to be reduced in multiple times, wherein each of reducing ranges for the drive current is greater than or equal to a next one, or a first couple of reducing ranges for the drive current is greater than a last couple of reducing ranges for the drive current.

* * * * *